United States Patent [19]
Hoashi

[15] 3,655,004
[45] Apr. 11, 1972

[54] HYDRAULICALLY DRIVEN VEHICLE
[72] Inventor: Kenzo Hoashi, Tokyo, Japan
[73] Assignee: Kabushiki Kaisha Komatsu Seisakusho (Komatsu, Ltd.), Tokyo, Japan
[22] Filed: Feb. 16, 1970
[21] Appl. No.: 11,404

[30] Foreign Application Priority Data

Mar. 27, 1969 Japan.............................44/22717
Feb. 22, 1969 Japan.............................44/15441
Apr. 8, 1969 Japan.............................44/27147

[52] U.S. Cl.........................180/6.48, 60/53 R, 60/97 E, 180/66 R
[51] Int. Cl...........................................B62d 11/04
[58] Field of Search.............180/6.3, 6.48, 66 R, 44 F; 60/53 R, 97 E

[56] References Cited

UNITED STATES PATENTS

| 3,416,311 | 12/1968 | Yoshizawa | 180/6.48 X |
| 3,357,513 | 12/1967 | Sundberg | 180/6.48 X |
| 2,465,484 | 3/1949 | Robinson | 60/53 R |
| 2,980,193 | 4/1961 | Baudhuin et al. | 180/6.48 |
| 3,091,930 | 6/1963 | Thoma et al. | 60/53 R |
| 2,126,255 | 8/1938 | Hacker | 180/6.48 |

FOREIGN PATENTS OR APPLICATIONS 807,550 1/1959 Great Britain......................180/6.48

Primary Examiner—Benjamin Hersh
Assistant Examiner—Leslie J. Paperner
Attorney—Steinberg and Blake

[57] ABSTRACT

The hydraulically driven vehicle of the wheeled vehicle type or the crawler vehicle type, provided with a short-circuit line between a pair of main passages for the liquid medium for communicating them with each other only during the operating lever is in neutral position, a braking system operable for the same period with the above, a tracting starting system which generates a difference in pressure between the pair of main passages when the hydraulic motor is reversely driven, and, in case of the crawler vehicle type, a pair of short lines connecting the higher pressured sides of said pair of main passages with each other and the lower pressured sides thereof with each other, respectively, and a friction clutch associating the two output shafts with each other, only during the two operating levers are in parallel.

3 Claims, 5 Drawing Figures

INVENTOR.
KENZO HOACHI

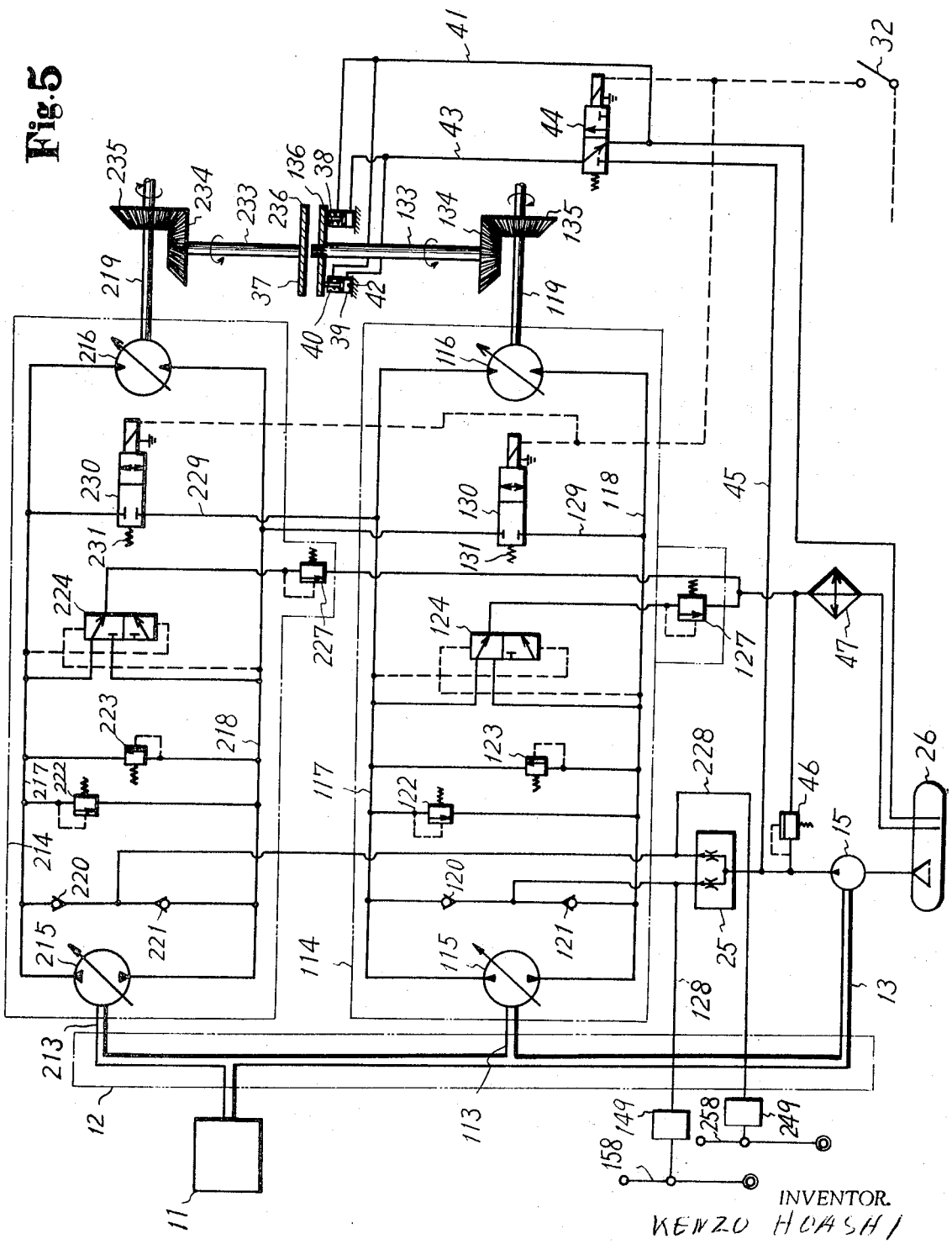

HYDRAULICALLY DRIVEN VEHICLE

This invention relates to improvements in the hydraulically driven vehicles, and particularly improvements in capabilities of starting the main engine of the vehicle by being trailed, in braking means of the vehicle, and in the anti-snaking means thereof.

The hydraulically driven vehicles are classified into two species of the wheeled vehicles and the crawler vehicles. The wheeled vehicle is represented by the fork lift truck and the crawler vehicle is represented by the bulldozer.

In general, a wheeled vehicle is provided with a driving system as shown in FIG. 1. There is a main engine 11 mounted on the vehicle, which is directly mechanically connected with an output transferring means 12 provided with two output shafts 13 and 113. The output shaft 113 is mechanically connected with a variable displacement reversible hydraulic pump 115 belonging to a hydraulic power transmission system 114. The output shaft 13 is mechanically connected with an auxiliary fixed displacement pump 15. The auxiliary fixed displacement pump 15 serves to supplement liquid medium to the hydraulic power transmission system 114 comprising the variable displacement reversible hydraulic pump 115, a reversible hydraulic motor 116 and a pair of main passages 117 and 118 for the liquid medium connecting the hydraulic pump 115 with the hydraulic motor 116. An output shaft 119 of the hydraulic motor 116 is mechanically connected with a driving axle (not shown) of the vehicle intermediate suitable gearings.

In addition, the hydraulic power transmission system 114 is provided with various valve means such as check valves 120 and 121 for supplementing pressured liquid medium into the system from a reservoir 26, relief valves 122 and 123 for setting the highest pressure of the liquid medium in the two main passages 117 and 118, respectively, and a shuttle valve 124 for draining the pressured liquid medium in the main passages 117 or 118 of the low pressure side. The main passage 117 or 118 of the low pressure side is selectively fed with the pressured liquid medium from the auxiliary pump 15 intermediate a pressure distributor 25 and the check valve 120 or 121. The relief valves 122 and 123 short the main passages 117 and 118 in such a manner that the liquid medium in the main passage 117 or 118 of the high pressure side is permitted to leak into the other main passage of the low pressure side. The shuttle valve 124 is provided with pressure sensing ports connected with the main passages 117 and 118 and the down-stream side of the shuttle valve 124 is connected with the reservoir 26 intermediate a relief valve or an unload valve 127 and a heat exchanger 47. The down-stream side of the relief valve 127 is connected with the outlet of the auxiliary pump 15 intermediate another relief valve 46.

For controlling the speed of the output shaft 119 of the hydraulic motor 116, an auxiliary pressure liquid medium line 128 is branched from the down-stream side of the auxiliary pump 15 and leads to a pump-and-motor controlling means 149 mechanically controlled by an operating lever or shift lever 158 intermediate a link 162. (FIG. 3) Thus, in order to control the rotation of the driving axle, the speed of the output shaft 119 is controlled by the operating lever 158 in such a manner that, for example, in case that the variable displacement reversible hydraulic pump 115 is a plate axial plunger pump or in case that the reversible hydraulic motor 116 is a plate axial plunger motor, the inclination of their swash plate (not shown) is varied intermediate a controlling mechanism (not shown).

However, in case it is difficult to start the main engine 11 by a self starter comprising a cell and an electric motor, it is necessitated to be trailed by another vehicle to start the main engine 11. During the main engine 11 is stopped, however, the operative member such as the swash plate of the variable displacement reversible hydraulic pump 115 (or the hydraulic motor 116) has been restored to the neutral position, and therefore, it is impossible to rotate the hydraulic pump 116 by the pressure generated by the hydraulic motor 116. Under these circumstances, in accordance with the prior art, there is provided a tracting starting auxiliary pump 80 adapted to be rotated by the output shaft 119 of the hydraulic motor 116. In case of the tracting starting, the operative member of the hydraulic pump 115 (or the hydraulic motor 116) is fed with the liquid medium exhausted from the tracting starting auxiliary pump 80 for forcibly bringing the operative member into the controllable state (in case of a variable displacement hydraulic pump or motor, the swash plate is forcibly inclined). By this means, the main engine 11 is reversely driven for starting intermediate the output transferring means 12.

In case of a crawler vehicle, a left and a right driving wheels are separately driven by two hydraulic motors of two hydraulic power transmission systems driven by a single main engine, respectively, so that it is necessary to provide another hydraulic power transmission system 214 other than the hydraulic power transmission system 114 detailedly described hereinbefore, which is quite similar to the latter except that the tracting starting auxiliary pump 80 is provided on either side.

Reference is now made to FIG. 2 illustrating the hydraulic power transmission systems 114 and 214 and relating portions of a crawler vehicle. There is a single main engine 11 mounted on the vehicle, which is directly mechanically connected with an output transferring means 12 provided with three output shafts 13, 113 and 213 quite similar to the case of the wheeled vehicle described hereinbefore. However, the output shaft 213 is mechanically connected with a variable displacement reversible hydraulic pump 215 belonging to another hydraulic power transmission system 214. The hydraulic power transmission system 214 is provided with a pair of main passages 217 and 218, a hydraulic motor 216, check valves 220 and 221, relief valves 222 and 223, a shuttle valve 224, an auxiliary pressure liquid medium line 228, a pump-and-motor controlling means 249, and an operating lever 258 quite similarly to the other hydraulic power transmission system 114. Thus the left and right driving wheels are independently controlled by the independent operating levers 158 and 258 of each other.

The hydraulically driven vehicle of either the wheeled vehicle type or the crawler vehicle type has, in general, various drawbacks. At first it is difficult to completely stop the driving axles of the driving wheels or to park the vehicle as far as the main engine 11 is not stopped due to the fact that it is difficult to accurately zero the outputs of the hydraulic pumps 115 and 215. Particularly, in case the vehicle is parked on a grade and therefore on such a condition that the hydraulic motors 116 and 216 are loaded, even if the main engine 11 is apparently completely stopped by zeroing the outputs of the hydraulic pumps 115 and 215 and blocking the main passages 117 and 217 from the other main passages 118 and 218, respectively, it is impossible to make the vehicle keep in the completely stopped state for a long period due to a leak of the liquid medium communicating with the main passages. By virtue of the early apparently complete stopping of the vehicle, the operator is apt to erroneously acknowledge the state, and therefore, this drawback is very dangerous and may result in an accident.

When a vehicle is intended to be trailed by another vehicle, the main engine 11 is stopped and the operating levers 158 and 258 are positioned in the neutral positions, and therefore, the swash plates of the hydraulic pumps 115 and 215 are positioned also in the neutral positions. By virtue of this positioning, the main passages 117 and 217 are blocked from the main passages 118 and 218, so that it is impossible to tract the vehicle by another vehicle due to a large resistance.

It is also impossible to run the vehicle by inertia when the operating levers 158 and 258 and the swash plates are in the neutral positions. It is also impossible to run the vehicle at a speed other than those defined by the pump-and-motor controlling means 149 and 249.

On the contrary, when the main engine 11 has been stopped, it is difficult to start it by being trailed or by tracting starting. Although the tracting starting auxiliary pump 80 is generally provided for this purpose, it is undesirable to provide such an expensive member, because it is useless after the main engine 11 has been once started. In addition, there may be a difficulty in the protection of the liquid medium circuits when the main engine 11 is being started. If the liquid medium has leaked out of the hydraulic power transmission systems 114 and 214 during the main engine 11 is stopped for a long time, it is impossible to start the main engine 11 by means of the tracting starting.

In case of the crawler vehicle, in accordance with the prior art, there are two auxiliary pressure liquid medium lines 128 and 228 for supplying the operating lever systems with the pressured liquid medium, which are branched from the downstream side of the pressure distributor 25 and extended to pump-and-motor controlling means 149 and 249 of the hydraulic power transmission systems 114 and 214, respectively. Two operating levers 158 and 258 independent of each other are mechanically connected with the two pump-and-motor controlling means 149 and 249 for controlling the speeds of the driving axles of the left and right driving wheels, respectively, whereby the speed of the vehicle is controlled. Theoretically speaking, since the two hydraulic power transmission systems 114 and 214 are formed quite identically with each other, when the two operating levers 158 and 258 are quite identically positioned, it is quite natural that the hydraulic motors 116 and 216 are quite identically rotated so as to advance the vehicle in bee line. It is actually practical, however, that the rotations of the hydraulic motors 116 and 216 differ from each other due to individual differences of the members and plays in mechanical connections thereof with each other, ending in to snake the vehicle. In order to improve such controllability, the preciseness has been heightened in manufacture. However, during the vehicle is used, an unbalanced left with the right occurs and grows by degrees, and therefore, it is impossible to automatically avoid the snaking of the vehicle. In order to advance the vehicle rectilinearly, it is required that the operator equalize the rotations of the two hydraulic motors 116 and 216 to each other by delicate relative operations of the operating levers 158 and 258, which are very laborious if continued for a long time.

One object of this invention is to provide a hydraulically driven vehicle which may be reliably parked without stopping the main engine even on a grade and for a long period.

Another object of this invention is to provide a hydraulically driven vehicle which may be trailed by another vehicle while the main engine is stopped.

Still another object of this invention is to provide a hydraulically driven vehicle, of which the main engine may be easily started by being trailed by another vehicle without the provision of a tracting starting auxiliary pump.

Further another object of this invention is to provide a hydraulically driven vehicle of the crawler type prevented from snaking.

Briefly stated in accordance with one aspect of this invention, there is provided a hydraulically driven vehicle comprising a main engine, at last a hydraulic power transmission system, an auxiliary fixed displacement pump, and a short-circuit line. The hydraulic power transmission system comprises a variable displacement hydraulic pump, a hydraulic motor, and a pair of main passages for a liquid medium connecting the hydraulic pump with the hydraulic motor. The variable displacement hydraulic pump is mechanically driven by the main engine and hydraulically controlled by a pump-and-motor controlling means mechanically controlled by an operating lever. The hydraulic motor is adapted to drive at least a driving wheel. The auxiliary fixed displacement pump is adapted to be mechanically driven by the main engine for supplying the liquid medium to the hydraulic power transmission system. The short-circuit line for the liquid medium is inserted between the pair of main passages for shorting the pair when the operating lever is in the neutral position.

In accordance with this invention, the short-circuit line is provided with a two-way two position direction change-over valve adapted to be controlled either electromagnetically correspondingly to manual operation of the operating lever, or manually.

In accordance with this invention, the above-mentioned hydraulically driven vehicle further comprises a braking system adapted to act on an output shaft of the hydraulic motor. The braking system comprises a braking drum secured to the output shaft and a braking band hydraulically controlled correspondingly to manual operation of the operating lever.

In accordance with this invention, the above-mentioned hydraulically driven vehicle further comprises a tracting starting system adapted to additionally supply the pump-and-motor controlling means with liquid medium by virtue of the difference in pressure between the liquid medium contained in the pair of the main passages generated by the hydraulic motor reversely driven by the driving wheel, for the tracting starting of the main engine.

Further in accordance with this invention, the above-mentioned hydraulically driven vehicle of the crawler type comprising two hydraulic power transmission systems and two operating levers, further comprises an anti-snaking system. The anti-snaking system is adapted to clutch two out-put shafts of two hydraulic motors of the two hydraulic power transmission systems with each other and, at the same time, to communicate the two hydraulic power transmission systems with each other correspondingly.

The invention will be better understood and other objects and additional advantages of the invention will become apparent upon perusal of the following description taken in connection with the drawings, in which:

FIG. 5 is a schematic view of a driving system of a hydraulically driven vehicle of the crawler vehicle type in accordance with this invention.

Similar numerals refer to similar parts throughout the several views.

Figure 1:
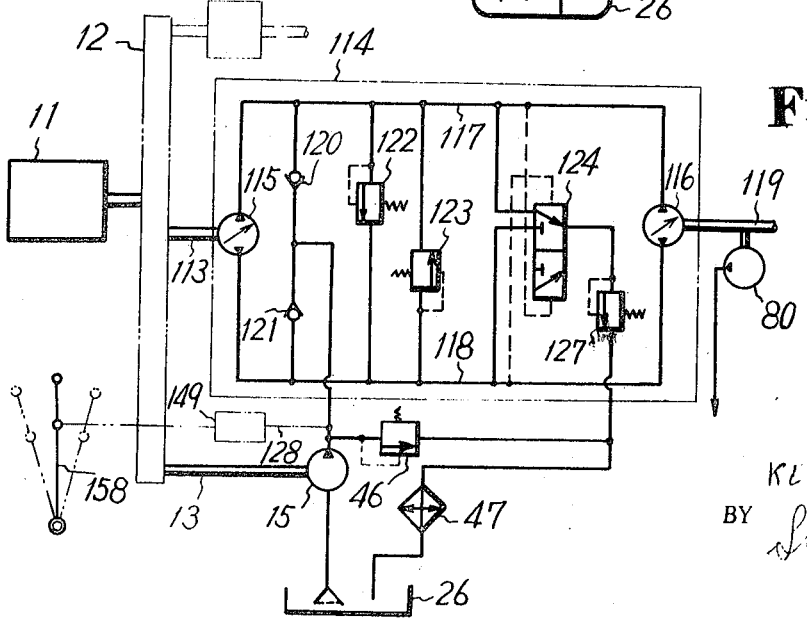
FIG. 1 is a schematic view of a driving system of a hydraulically driven vehicle of the wheeled vehicle type in accordance with the prior art.
Figure 3:
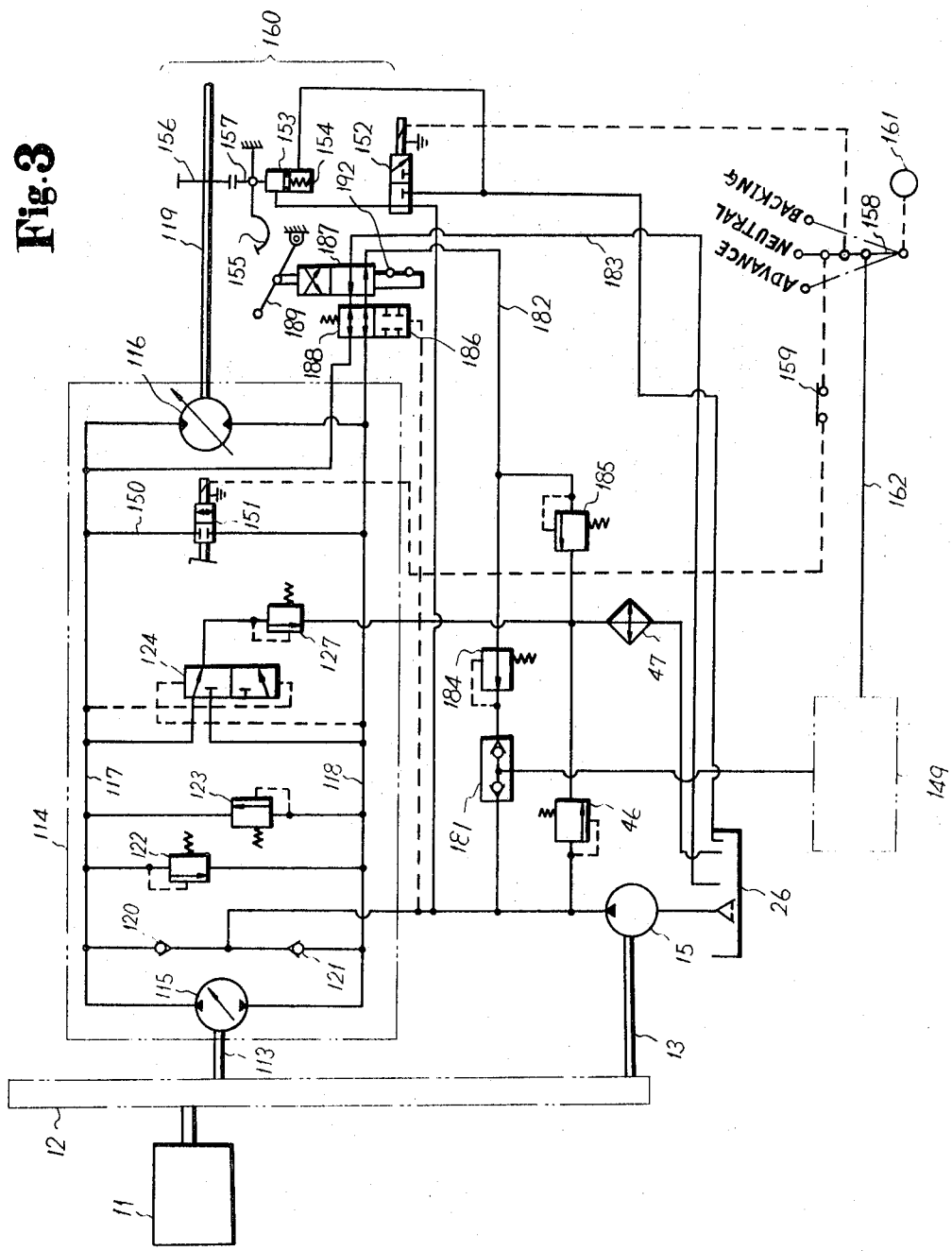
FIG. 3 is a schematic view of a driving system of a hydraulically driven vehicle of the wheeled vehicle type in accordance with this invention.

Referring more particularly to the drawings, the preferred embodiments of this invention will now be described; however, this description will be understood to be illustrative of the invention and not as limiting it to the particular arrangements as shown and described. There is a driving system of a hydraulically driven vehicle of the wheeled vehicle type, for example, a fork lift truck as shown in FIG. 3, which is similar to the well known one shown in FIG. 1, but at first provided with a short-circuit line 150 inserted between the main passages 117 and 118. A two-way two-position direction change-over valve 151 is provided in the short-circuit line 150, which is adapted to be electromagnetically operated and electrically connected with the operating lever 158 intermediate an electric interrupter 159. When the operating lever 158 is positioned in neutral, an electrical current is supplied form a battery 161 to the change-over valve 151 for sliding a spool of the change-over valve 151 leftward in FIG. 3, so as to communicate the main passage 117 with the other main passage 118.

When it is intended to park the vehicle while the main engine 11 is being operated, it is necessary to bring the output of the hydraulic pump 115 to accurate zero. It is actually difficult in practice. In accordance with this invention, even if the output is not accurately zeroed, the hydraulic motor 116 is not possibly driven by the hydraulic pump 115. The change-over valve 151 is further adapted to be manually controlled.

For the parking purpose, the fixed state of the hydraulic motor 116 is further secured by means of a braking system 160. The braking system 160 comprises a braking drum 156 secured to the output shaft 119 of the hydraulic motor 116 and a braking band 157 adapted to associate therewith. There is a spring-loaded piston housed in a cylinder 153, which is adapted to operate the braking band 157. When a pressure of the liquid medium acts on the piston, the braking band 157 is released form the brake drum 156 against the action of the spring 154 in the cylinder 153. The liquid medium is directed from the auxiliary fixed displacement pump 15 intermediate a three-way two-position solenoid operated valve 152 electromagnetically connected with the operating lever 158. When the operating lever 158 is positioned in neutral as above for the parking purpose, a spool of the solenoid operated valve 152 is slid leftward in FIG. 3, the liquid medium in the cylinder 153 being cut off from the auxiliary fixed displacement pump 15, so that the braking band 157 acts on the braking drum 156 for assuring the parking state of the vehicle. The braking band 157 is also manually operable by means of a pedal 155.

For advancing or backing, it is apparent that it is necessary that the operating lever 158 is brought into the advancing position or the backing position. By this control and at the same time therewith, the two solenoid operated valves 151 and 152 are released from the electromagnetic actions so as to restore the spools, and therefore, the short-circuit line 150 is cut off and the braking drum 156 is released from the braking band 157.

When it is intended to run the vehicle by the inertia or to inch the vehicle, it is necessary to break the interruptor 159 and manually control the solenoid operated valve 151 so as to short the pair of the main passages 117 and 118. Upon the communication of the main passage 117 with the other 118, it is possible to run the vehicle by the inertia or inch it, which have been considered impossible in these hydraulically driven vehicles.

When it is intended to trail the vehicle while the main engine 11 is stopped, the pedal 155 is temporarily fixedly positioned in the brake releasing position so as to release the braking band 157 from the braking drum 156 against the action of the spring 154 and the solenoid operated valve 151 is manually operated for the communication of the main passage 117 with the main passage 118. Otherwise, the operating lever 158 is brought into the neutral position. Upon the communication between the two main passages 117 and 118, it is easily possible to trail the vehicle by another vehicle without any resistance.

Figure 2:
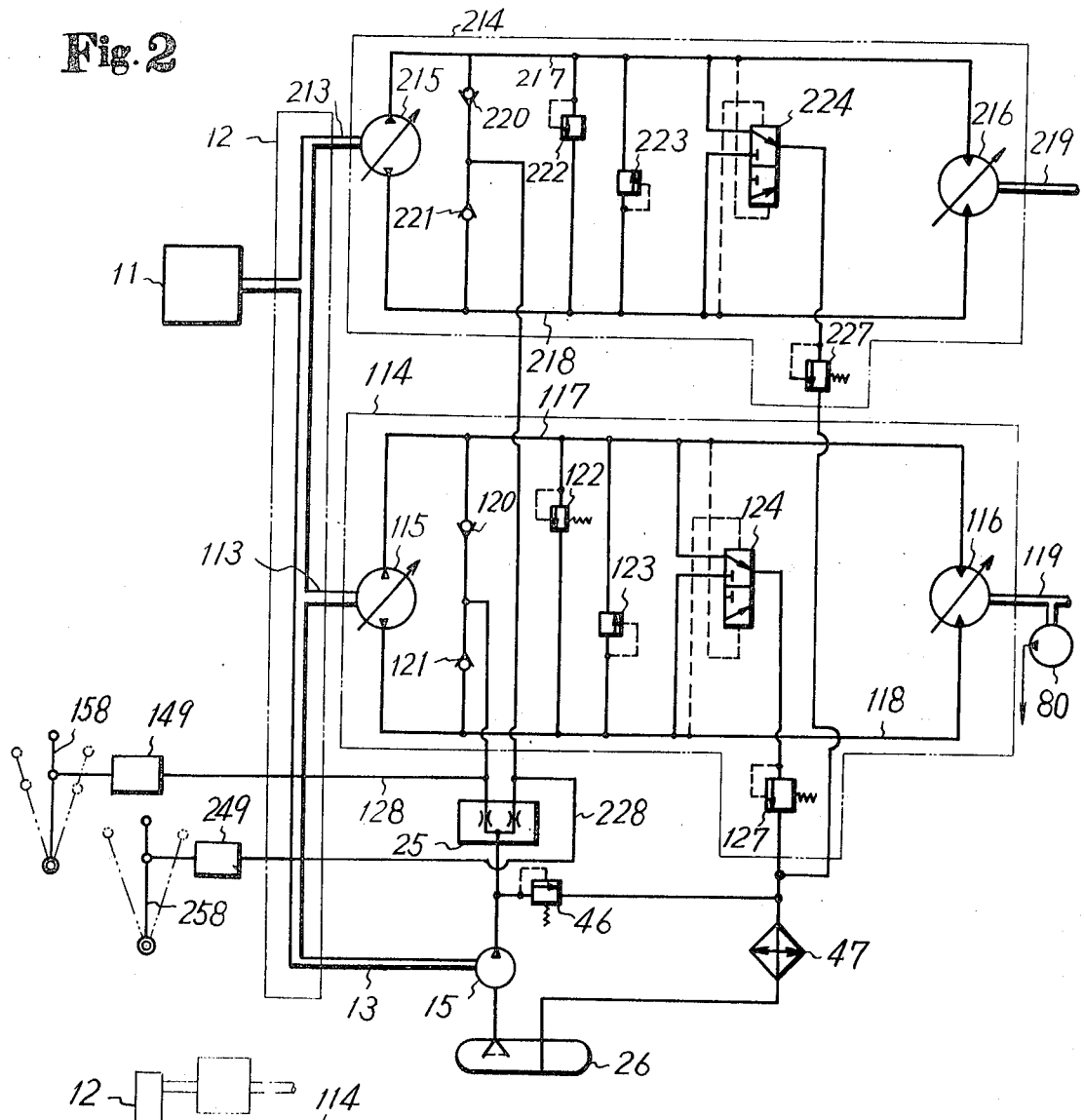
FIG. 2 is a schematic view of a driving system of a hydraulically driven vehicle of the crawler vehicle type in accordance with the prior art.

In accordance with the prior art, a tracting starting auxiliary pump 80 (FIGS. 1 and 2) is provided for starting the main engine 11 in the tracting starting manner. In accordance with this invention, this expensive equipment is removed and a tracting starting hydraulic means comprising several valves is provided, as shown in FIG. 3. An automatic shuttle valve 181 which can automatically select the high pressure side is inserted between the exhaust side of the auxiliary fixed displacement pump 15 and the pump-and-motor controlling means 149. Another intake port of the shuttle valve 181 is connected with the main passage 118 by a starting line 182. Another starting line 183 is branched from the main passage 117 and extended to the reservoir 26 for draining. A low pressure relief valve 184 is inserted between a junction in the starting line 182 and the automatic shuttle valve 181 and a high pressure relief valve 185 is inserted between the junction and the reservoir 26 for expelling an excess of the liquid medium.

A cut-off valve 186 and a direction change-over valve 187 are inserted in the two starting lines 182 and 183 lumped together. The cut-off valve 186 is normally biassed to the communicating position by the action of a spring 188. The direction change-over valve 187 is manually operable so as to communicate the main passages 117 and 118 with the starting lines 183 and 182, respectively, and vice versa. The cut-off valve 186 is pressure sensible and the pressure sensible port thereof is communicated with the exhaust side of the auxiliary fixed displacement pump 15 so that, when the pressure in the exhaust side of the auxiliary fixed displacement pump 15 is elevated to an extent, the cut-off valve 186 is automatically positioned to a cut-off position for the two starting lines 182 and 183 against the action of the spring 188. The direction change-over valve 187 is manually selectively handled by a lever 189 between two positions adapted to be locked therein by detents 192, so that it is possible to selectively connect a tracting starting circuit of liquid medium for a direction, in which the vehicle is trailed.

In operation, the main engine 11 is at first started as described hereinafter. During the main engine 11 is in operation, the hydraulic pump 115 and the auxiliary fixed displacement pump 15 generate pressure by the output of the main engine 11 transferred thereto intermediate the output transferring means 12. The pressured liquid medium exhausted from the auxiliary fixed displacement pump 15 acts on the cut-off valve 186 so as to cut off the two starting lines 182 and 183 against the action of the spring 188. Upon cutting off the two starting lines 182 and 183, the two main passages 117 and 118 becomes quite similar to the conventional construction. Under these circumstances, the output of the hydraulic pump 115 may be hydraulically controlled from the pump-and-motor controlling means 149, which is mechanically connected with the operating lever 158, and therefore, the rotation of the hydraulic motor 116 is controlled by the operating lever 158.

When the main engine 11 is stopped, the auxiliary fixed displacement pump 15 is stopped so that the pressure of the liquid medium in the exhaust thereof is lowered, ending in to communicate the two starting lines 182 and 182 at the cut-off valve 186 by virtue of the spring 188. Under these circumstances, by tracting the vehicle by another suitable vehicle, the hydraulic motor 116 is reversely driven by the driving wheel and acts as a pump, so that a difference in pressure is generated between the two main passages 117 and 118. In this case, if the hydraulic power transmission system 114 is short of liquid medium, it is supplemented in the following two manners conditional on that the cut-off valve 188 and the direction change-over valve 187 are positioned as shown: the liquid medium contained in the reservoir 26 is supplemented into the main passage 117 intermediate the starting line 183, the direction change-over valve 187 in the parallel flow position, and the cut-off valve 186 in the communicating state, and the pressured liquid medium contained in the main passage 118 is fed to the pump-and-motor controlling means 149 intermediate the cut-off valve 186, the direction change-over valve 187, the starting line 182, the low pressure relief valve 184, and the shuttle valve 181, so that the pump-and-motor controlling means 149 is brought into the operable state, ending in that it is possible to reversely drive the main engine 11 from the variable displacement hydraulic pump 115 intermediate the output transferring means 12. It is to be understood that the direction change-over valve 187 should be manually changed over depending upon the direction of the traction.

Figure 4:
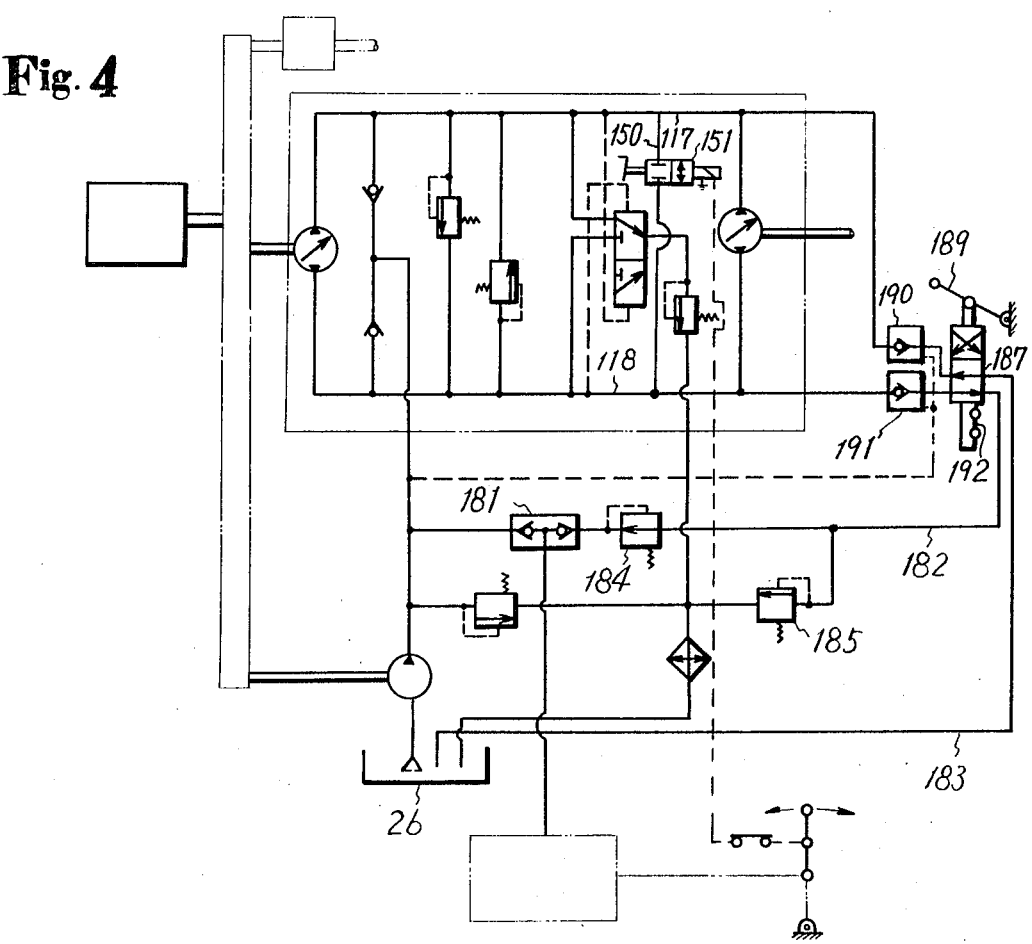
FIG. 4 is a partly removed schematic view of a modification thereof.

Reference is now made to FIG. 4 illustrating a modification of the above-mentioned embodiment of this invention. In this modification, the cut-off valve 186 is replaced by a pair of pilot check valves 190 and 191. This modification is quite similar to the preceding embodiment in function.

Reference is now made to FIG. 5 illustrating a driving system of a hydraulically driven vehicle of the crawler type, The above-mentioned features of this invention are of course rendered also to such a vehicle. In addition, an anti-snaking means is provided thereto, which has been an unsolved significant problem in the crawler type vehicle.

In accordance with the prior art, the left and right driving wheels are controlled by two operating levers 158 and 258 independently of each other. When it is intended to run the vehicle in bee line, the two operating levers 158 and 258 are positioned quite similarly for rotating the two hydraulic motors 116 and 216 quite equally. However, it is actually very difficult in practice to do so as stated hereinbefore, and therefore, it is unavoidable to snake the vehicle.

In accordance with this invention, there are a pair of short lines 129 and 229. The short line 129 connects the main passage 118 of a hydraulic power transmission system 114 with the main passage 218 of the other hydraulic power transmission system 214. The short line 229 connects the main passage 117 of the hydraulic power transmission system 114 with the main passage 217 of the other system 214. Two solenoid operated short valves 130 and 230 are inserted into the short lines 129 and 229, which are normally interrupted by the action of spring 131 and 231, respectively, and controlled by a switching means 32 as described hereinafter.

During the vehicle is advanced and the hydraulic pumps 115 and 215 are driven, it is natural that either side of each of the two hydraulic power transmission systems 114 and 214 are the high pressure sides, and thus, it is possible to suppose that the main passages 118 and 218 are the high pressure sides. The hydraulic motors 116 and 216 have output shafts 119 and 219, respectively, which are co-operated by a synchronizing means in accordance with this invention. The synchronizing means comprises a pair of third shafts 133 and 233 arranged in alignment with each other. A pair of bevel gears 134 and 234 are mounted on one ends of the third shafts 133 and 233 and engaged with another pair of bevel gears 135 and 235 mounted on the output shafts 119 and 219, respectively, so that the two third shafts 113 and 233 are adapted to be rotated in the same direction with each other. A releasable member 136 of a friction clutch 37 is mounted on the other end of the third shaft 133 and the other member 236 of the friction clutch 37 is fixedly mounted on the other end of the other third shaft 233 for constituting the friction clutch 37. This friction clutch 37 is hydraulically operated and normally kept in the declutching position by the action of springs 38 housed in cylinders 39 and anchored to pistons adapted to be slidable therein. The chambers 40 of the cylinders 39, in which the springs 38 are received, are connected with the liquid medium reservoir 26 through drainages 41. The recesses 42 of the cylinders 39 are communicated with the exhaust side of the auxiliary fixed displacement pump 15 through a line 43, a change-over valve 44 and a line 45. The change-over valve 44 is a solenoid operated valve which normally communicates the line 45 with a drainage leading to the reservoir 26 together with the drainage 41.

The switching means 32 is adapted to normally break an electrical circuit and to make it only during the two operating levers 158 and 258 are positioned about correspondingly with each other. For example, a microswitch (not shown) mounted on one operating lever is adapted to be sensible to positions of the other operating lever. When the switching means 32 is on, the two solenoid operated short valves 130 and 230 are slid to communicate the main passage 118 with the main passage 218 and the main passage 117 with the main passage 217, respectively, and the solenoid operated change-over valve 44 is slid to communicate the line 45 with the line 43. Thus, the switching means 32 forms a means for responding automatically to positioning of the operating levers 158 and 258 correspondingly with each other for actuating the pair of valve means 130 and 230 to connect the main passages 118 and 218 with each other through the short-circuit line 129 and the passages 117 and 217 with each other through the line 229.

During the vehicle is running not rectilinearly, the two operating levers 158 and 258 are not positioned correspondingly with each other, and therefore, the switching means 32 is off and the short valves 130 and 230 and the change-over valve 44 are positioned as shown in FIG. 5, respectively. Thus the friction clutch 37 is released so as to bring one hydraulic motor, for example, 116 into independence of the other hydraulic motor, for example, 216. At the same time, the two hydraulic power transmission systems 114 and 214 are blocked form each other at the two short valves 130 and 230. Under these circumstances, it is possible to rotate the two driving wheels independently of each other for steering the vehicle.

When it is intended to run the vehicle in bee line, it is natural and conventional to position the two operating levers 158 and 258 correspondingly with each other. In accordance with this invention, the corresponding positions of the two operating levers 158 and 258 with each other are sensed electrically, whereby the friction clutch 37 and the two short valves 130 and 230 are controlled. In this case, the rotations of the two output shafts 119 and 219 are about identical, so that the clutching operation is facilitated. By introduction of the pressure liquid medium into the recesses 42 of the cylinders 39 through the change-over valve 44 electromagnetically operated from the operating levers 158 and 258 intermediate the switching means 32, the releasable member 136 is clutched with the other member 236 of the friction clutch 37. At the same time, the main passage 117 of the hydraulic power transmission system 114 is communicated with the main passage 217 of the other hydraulic power transmission system 214 and the main passage 118 of the former system 114 is communicated with the main passage 218 of the latter system 214, so that even if there is a slight difference between the two outputs of the two hydraulic pumps 115 and 215, the two hydraulic power transmission systems 114 and 214 are equalized with each other, and therefore, the rotations of the two output shafts 119 and 219 are equalized with each other without any irrationality. Thus the snaking of the vehicle is easily avoided.

While particular embodiments of this invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. In a hydraulically driven vehicle comprising a main engine, at least a hydraulic power transmission system, and an auxiliary fixed displacement pump, said hydraulic power transmission system comprising at least one variable displacement hydraulic pump, at least one hydraulic motor, and at least one pair of main passages for a liquid medium connecting said hydraulic pump with said hydraulic motor, said variable displacement hydraulic pump being mechanically driven by said main engine and hydraulically controlled by a pump-and-motor controlling means mechanically controlled by at least one operating lever, said hydraulic motor being adapted to drive at least a driving wheel, and said auxiliary fixed displacement pump being adapted to be mechanically driven by said main engine for supplying said liquid medium to said hydraulic power transmission system, a short-circuit line for said liquid medium inserted between said pair of main passages in response to operation of said operating lever, said hydraulic power transmission system being doubled into two identical systems independent of each other, and comprising a pair of said short-circuit lines which connect the higher pressured ones of said two pairs of main passages with each other and the lower pressured ones thereof, with each other, respectively, a pair of valve means respectively situated in said pair of short-circuit lines for opening and closing the latter, and means for responding only when said two operating levers are positioned correspondingly to each other for placing said pair of valve means respectively in said pair of short-circuit lines in open positions.

2. In a hydraulically driven vehicle comprising a main engine, at least a hydraulic power transmission system, and an auxiliary fixed displacement pump, said hydraulic power transmission system comprising at least one variable displacement hydraulic pump, at least one hydraulic motor, and at least one pair of main passages for a liquid medium connecting said hydraulic pump with said hydraulic motor, said variable displacement hydraulic pump being mechanically driven by said main engine and hydraulically controlled by a pump-and-motor controlling means mechanically controlled by at least one operating lever, said hydraulic motor being adapted to drive at least a driving wheel, and said auxiliary fixed displacement pump being adapted to be mechanically driven by said main engine for supplying said liquid medium to said hydraulic power transmission system, a short-circuit line for said liquid medium inserted between said pair of main passages in response to operation of said operating lever, said hydraulic power transmission system being doubled into two identical systems independent of each other, and comprising a pair of said short-circuit lines which connect the higher pressured ones of said two pairs of main passages with each other and the lower pressured ones thereof, with each other, respectively, only when said two operating levers are positioned correspondingly to each other, a pair of short valves being inserted into said pair of short lines, respectively, and electromagnetically controlled form a switching means adapted to make an electric circuit in response to the corresponding positioning of said operating levers.

3. The combination of claim 2, and which further comprises a friction clutch adapted to connect two output shafts of said hydraulic motors with each other and hydraulically operated by said liquid medium intermediate a change-over valve electromagnetically controlled form said switching means.

* * * * *